United States Patent
Lu

(10) Patent No.: US 7,857,459 B2
(45) Date of Patent: Dec. 28, 2010

(54) PROJECTOR WITH DUST SUCTION MEMBER

(75) Inventor: Hou-Chen Lu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 513 days.

(21) Appl. No.: 11/960,661

(22) Filed: Dec. 19, 2007

(65) Prior Publication Data

US 2009/0122270 A1 May 14, 2009

(30) Foreign Application Priority Data

Nov. 9, 2007 (CN) .................. 2007 1 0202441

(51) Int. Cl.
*G03B 21/16* (2006.01)
(52) U.S. Cl. .......................... 353/60; 353/61
(58) Field of Classification Search .................. 353/60, 353/61
See application file for complete search history.

(56) References Cited

U.S. PATENT DOCUMENTS 5,544,142 A * 8/1996 Funakiri .................... 720/650
6,139,154 A    10/2000 Haba
6,416,184 B1 *  7/2002 Arai et al. .................. 353/52
2007/0296819 A1 * 12/2007 Takizawa et al. ........... 348/175

FOREIGN PATENT DOCUMENTS

CN    2710019 Y    7/2005

* cited by examiner

*Primary Examiner*—Tony Ko
(74) *Attorney, Agent, or Firm*—Jeffrey T. Knapp

(57) ABSTRACT

A projector includes a light source, an electro-optical device, a projection lens, an outer casing for housing the above components, and a dust suction member. The electro-optical device is configured for forming an optical image using a light beam emitted from the light source. The projection lens is configured for projecting the optical image formed by the electro-optical device. The outer casing is configured for housing the light source, the electro-optical device and the projection lens therein, the outer casing having an inlet and an outlet and defining an airflow channel in communication with the inlet and the outlet. The dust suction member is arranged in the airflow channel, the dust suction member having an adhesive outer surface.

4 Claims, 1 Drawing Sheet

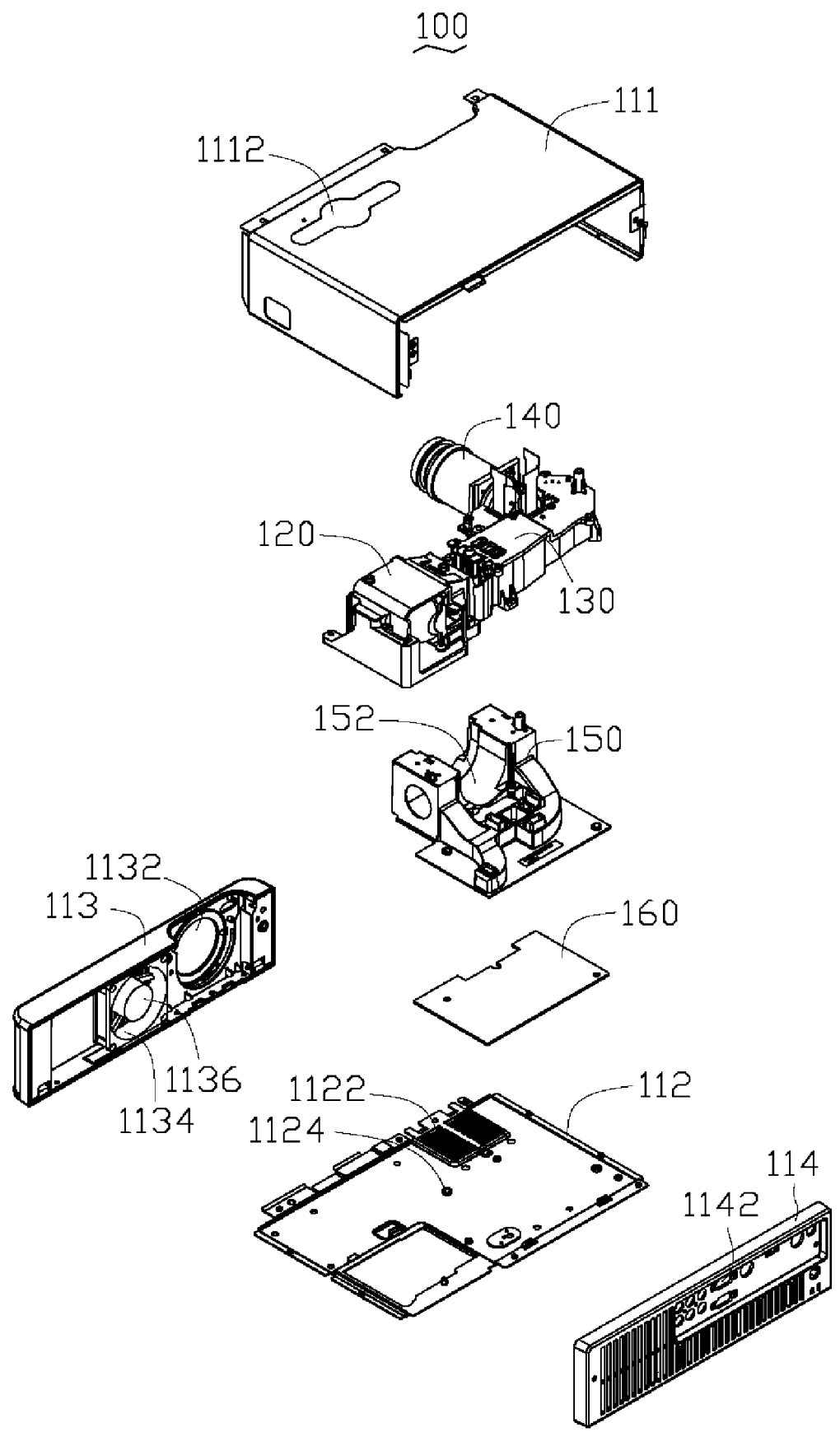

PROJECTOR WITH DUST SUCTION MEMBER

TECHNICAL FIELD

The present invention relates to a projector, particularly, to a projector including an electro-optical device for forming an optical image according to image information, a projection lens for enlarging and projecting the optical image formed by the electro-optical device, and an outer casing for housing these components.

DESCRIPTION OF RELATED ART

Hitherto, a projector has been known which includes a light-source unit having a light source, an electro-optical device for forming an optical image according to image information by using a light beam emitted from the light source, a projection lens for enlarging and projecting the optical image formed by the electro-optical device, and an outer casing for housing these components. Such projectors are widely used for multimedia presentations at conferences, academic meetings, exhibitions, and the like.

Since heat-generating members, such as a light source, and a power-supply unit, are contained in the outer casing of the projector, the inside of the device needs to be efficiently cooled. For that purpose, the outer casing for housing the components in the conventional projector is provided with an air inlet covered with a mesh for preventing dust entering the projector.

However, over time, dust may collect on the mesh impeding airflow at the inlet. Accordingly, the cooling efficiency of the projector will decrease.

What is needed, therefore, is a projector that can overcome the above-described shortcomings.

SUMMARY

In accordance with one present embodiment, a projector includes a light source, an electro-optical device, a projection lens, an outer casing for housing the above components, and a dust suction member. The electro-optical device is configured for forming an optical image using a light beam emitted from the light source. The projection lens is configured for projecting the optical image formed by the electro-optical device. The outer casing is configured for housing the light source, the electro-optical device and the projection lens therein, the outer casing having an inlet and an outlet and defining an airflow channel in communication with the inlet and the outlet. The dust suction member is arranged in the airflow channel, the dust suction member having an adhesive outer surface.

BRIEF DESCRIPTION OF THE DRAWING

Many aspects of the present projector can be better understood with reference to the following drawings. The components in the drawing are not necessarily drawn to scale, the emphasis instead being placed upon clearly illustrating the principles of the present projector.

The drawing is an exploded perspective view of a projector according to a present embodiment of the present invention.

DETAILED DESCRIPTION OF THE EMBODIMENTS

Embodiments of the present invention will now be described in detail below, with reference to the drawings.

Referring to drawing, a projector 100, according to an embodiment, is shown. The projector 100 includes a light source 120, an electro-optical device 130, a projection lens 140, a supporter 150, and an outer casing for housing these components.

The outer casing basically comprises an upper casing 111, a lower casing 112, a front casing 113, and a rear casing 114. These casings, which may be made of metal, such as magnesium, or resin, cooperate to encase the projector 100.

The upper casing 111 defines at least one opening 1112 for assembling and accessing control buttons of the projector 100. The lower casing 112 is opposite to the upper casing 111 and defines an air inlet 1122 therein to intake air for cooling the projector 100. The air inlet 1122 is a grid-shaped opening. The lower casing 112 has a number of positioning poles 1124 extending upward (toward interior of casing when assembled). The positioning poles 1124 are used for fixing components inside the projector 100.

The front casing 113 defines a light emitting hole 1132 for the projection lens 140 extending out from the projector 100 and an air outlet 1134. An exhaust fan 1136 is placed at the air outlet 1134 for increasing airflow speed between the air inlet 1122 and the air outlet 1134, improving the cooling efficiency of the projector 100. The rear casing 114 provides a number of holes 1142 for assembling corresponding input-output terminals of the projector 100 thereto.

The light source 120 is fixed to the top face of the lower casing 112 and is one of primary heat sources of the projector 100.

The electro-optical device 130 is configured for forming an optical image according to image information by using light emitted from the light source 120. The projection lens 140 is configured for enlarging and projecting the optical image formed by the electro-optical device 130.

The supporter 150 is fixed to the top face of the lower casing 112. The supporter 150 defines a receiving groove 152 for receiving and securing the projection lens 140 therein, in order that the projection lens 140 can be firmly positioned.

The projector 100 further includes at least one dust suction member 160 for trapping any dust that would get to or near a surface thereof. The dust suction member 160 can be attached to surfaces of any components in or around the airflow channel of the inside the projector 100, except for heat sources. In the present embodiment, the dust suction member 160 is fixed on the top surface of the lower casing 112 around the air inlet 1122 and along the airflow channel. The dust suction member 160 can be made of viscous material for trapping dust thus preventing the dust from accumulating on other components of the projector 100. The dust suction member 160 can also trap dust by electrostatic force. In the present embodiment, the dust suction member 160 includes a viscous material on a surface thereof. The viscous material can be a double-sided tape. Preferably, the dust suction member 160 as a whole comprises double-sided tape in order that the dust suction member 160 can be assembled and disassembled easily and the dust suction member 160 can be periodically changed with a new one cheaply and easily.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A projector comprising:

a light source;

an electro-optical device for forming an optical image using a light beam emitted from the light source;

a projection lens for projecting the optical image formed by the electro-optical device;

an outer casing for housing the light source, the electro-optical device and the projection lens therein comprising an upper casing and a lower casing opposite to the upper casing, the outer casing having an inlet defined on the lower casing and an outlet and defining an airflow channel in communication with the inlet and the outlet; and a dust suction member fixed on the top surface of the lower casing arranged in the airflow channel and around the inlet, and comprising a doubled-sided tape.

2. The projector as claimed in claim 1, wherein the dust suction member is comprised of a viscous material.

3. The projector as claimed in claim 1, wherein the dust suction member is mounted on the inner surface of the outer casing adjacent to the inlet.

4. The projector as claimed in claim 1, wherein the dust suction member sucking dust by electrostatic force.

* * * * *